United States Patent
Chandra et al.

(10) Patent No.: US 9,252,970 B2
(45) Date of Patent: Feb. 2, 2016

(54) MULTI-PROTOCOL I/O INTERCONNECT ARCHITECTURE

(75) Inventors: Prashant Chandra, Santa Clara, CA (US); Kevin C. Kahn, Portland, OR (US)

(73) Assignee: Intel Corporation, Santa Clara, CA (US)

(*) Notice: Subject to any disclaimer, the term of this patent is extended or adjusted under 35 U.S.C. 154(b) by 215 days.

(21) Appl. No.: 13/338,222

(22) Filed: Dec. 27, 2011

(65) Prior Publication Data
US 2013/0163474 A1 Jun. 27, 2013

(51) Int. Cl.
*H04L 12/28* (2006.01)
*H04L 12/46* (2006.01)

(52) U.S. Cl.
CPC ................... *H04L 12/4625* (2013.01)

(58) Field of Classification Search
CPC .............................. H04L 2012/4629
USPC .................. 370/254, 255, 256, 408
See application file for complete search history.

(56) References Cited

U.S. PATENT DOCUMENTS

| | | |
|---|---|---|
| 5,242,315 A | 9/1993 | O'Dea |
| 5,267,337 A | 11/1993 | Kirma |
| 5,419,717 A | 5/1995 | Abendschein et al. |
| 5,535,036 A | 7/1996 | Grant |
| 6,108,782 A | 8/2000 | Fletcher et al. |
| 6,478,625 B2 | 11/2002 | Tolmie et al. |
| 6,536,670 B1 | 3/2003 | Postman et al. |
| 6,549,966 B1 | 4/2003 | Dickens et al. |
| 6,588,938 B1 | 7/2003 | Lampert et al. |
| 6,783,283 B2 | 8/2004 | Nishita |
| 6,839,771 B1 | 1/2005 | Bouchier et al. |
| 7,081,023 B2 | 7/2006 | Zhang et al. |
| 7,095,927 B2 | 8/2006 | Yamada et al. |
| 7,171,505 B2 | 1/2007 | Kuhlmann et al. |
| 7,283,481 B2 | 10/2007 | Huff |
| 7,330,468 B1 | 2/2008 | Tse-Au |
| 7,412,544 B2 | 8/2008 | Gibson et al. |

(Continued)

FOREIGN PATENT DOCUMENTS

| | | |
|---|---|---|
| JP | 10-233820 | 9/1998 |
| JP | 2001-358733 | 12/2001 |

(Continued)

OTHER PUBLICATIONS

International Search Report and Written Opinion received for International Application No. PCT/US2008/084621, mailed on May 18, 2009.

(Continued)

*Primary Examiner* — Guang Li
(74) *Attorney, Agent, or Firm* — Schwabe, Williamson & Wyatt, P.C.

(57) ABSTRACT

Described are embodiments of methods, apparatuses, and systems for multi-protocol tunneling across a multi-protocol I/O interconnect of computer apparatus. A method for configuring a multi-protocol I/O interconnect may include identifying a plurality of switches of a switching fabric of a multi-protocol I/O interconnect, and configuring a path from a port of a first switch of the plurality of switches to a port of a second switch of the plurality of switches. Packets of a first protocol and packets of a second protocol, different from the first protocol, may be simultaneously routed over the path. Other embodiments may be described and claimed.

35 Claims, 21 Drawing Sheets

(56) References Cited

U.S. PATENT DOCUMENTS

| | | | |
|---|---|---|---|
| 7,437,738 B2 | 10/2008 | Shah et al. | |
| 7,587,536 B2 | 9/2009 | McLeod | |
| 7,646,981 B2 | 1/2010 | Coffey | |
| 7,677,813 B2 | 3/2010 | Anrig et al. | |
| 7,734,172 B2 | 6/2010 | Tse-Au | |
| 7,783,788 B1* | 8/2010 | Quinn et al. | 710/8 |
| 8,051,217 B2 | 11/2011 | Goodart et al. | |
| 8,121,139 B2 | 2/2012 | Sunaga et al. | |
| 8,576,844 B1* | 11/2013 | Ghosh | 370/390 |
| 2002/0035625 A1* | 3/2002 | Tanaka | 709/223 |
| 2002/0049862 A1 | 4/2002 | Gladney et al. | |
| 2004/0068589 A1* | 4/2004 | Witkowski et al. | 709/249 |
| 2004/0081158 A1* | 4/2004 | Moll et al. | 370/395.1 |
| 2004/0218551 A1* | 11/2004 | Goldberg et al. | 370/256 |
| 2006/0109801 A1* | 5/2006 | Ashwood Smith | 370/256 |
| 2006/0146857 A1* | 7/2006 | Naik | H04L 12/1428 370/432 |
| 2006/0206656 A1* | 9/2006 | Di Benedetto et al. | 710/316 |
| 2006/0236017 A1* | 10/2006 | Rooholamini et al. | 710/316 |
| 2007/0005867 A1 | 1/2007 | Diamant | |
| 2007/0008982 A1* | 1/2007 | Voit et al. | 370/401 |
| 2007/0118628 A1* | 5/2007 | Kumar et al. | 709/221 |
| 2007/0249193 A1 | 10/2007 | Penumatcha et al. | |
| 2009/0067428 A1* | 3/2009 | Balandin et al. | 370/392 |
| 2009/0172185 A1 | 7/2009 | Chandra et al. | |
| 2010/0049885 A1 | 2/2010 | Chandra et al. | |
| 2010/0110934 A1* | 5/2010 | Li | G06F 12/0831 370/256 |
| 2010/0182934 A1* | 7/2010 | Dobbins et al. | 370/254 |
| 2010/0189015 A1* | 7/2010 | Bragg et al. | 370/256 |
| 2010/0265849 A1* | 10/2010 | Harel | 370/256 |
| 2011/0134802 A1* | 6/2011 | Rajagopalan et al. | 370/256 |
| 2011/0305167 A1* | 12/2011 | Koide | 370/255 |
| 2011/0305168 A1* | 12/2011 | Koide | 370/255 |
| 2012/0076052 A1* | 3/2012 | Kling et al. | 370/256 |
| 2012/0106560 A1* | 5/2012 | Gumaste | H04L 45/04 370/401 |
| 2012/0207164 A1* | 8/2012 | Tanaka | 370/392 |
| 2012/0243403 A1* | 9/2012 | Hu et al. | 370/217 |
| 2012/0250683 A1* | 10/2012 | Sharief | 370/390 |
| 2012/0284434 A1* | 11/2012 | Warren et al. | 710/22 |
| 2013/0042291 A1* | 2/2013 | Kambhatla | 725/127 |
| 2013/0089094 A1* | 4/2013 | Csaszar et al. | 370/390 |
| 2013/0094361 A1* | 4/2013 | Kulkarni | H04L 12/4625 370/235 |
| 2013/0121164 A1* | 5/2013 | Shabtay et al. | 370/241.1 |

FOREIGN PATENT DOCUMENTS

| | | |
|---|---|---|
| KR | 10-2001-0076079 | 8/2001 |
| WO | 2009/085494 | 7/2009 |
| WO | 2010/021844 | 2/2010 |

OTHER PUBLICATIONS

International Preliminary Report on Patentability for International Application No. PCT/US2008/084621, mailed on Jul. 8, 2010.
International Search Report/Written Opinion for International Application No. PCT/US2009/052831, mailed on Mar. 15, 2010.
International Preliminary Report on Patentability and Written Opinion received for International Application No. PCT/US2009/052831, Mailed on Mar. 3, 2011.
Office Action for Taiwan Application No. 97147418, mailed Jun. 14, 2012.
Search Report for European Application No. 09808593.9, mailed on Aug. 19, 2011.
Office Action for European Application No. 09808593.9, mailed Sep. 13, 2011.
Search Report for European Application No. 08868735.5, mailed on Sep. 2, 2011.
Office Action for European Application No. 08868735.5, mailed on mailed Sep. 29, 2011.
Office Action for Korean Application No. 10-2010-7016587, mailed Jul. 11, 2011.
Office Action for Korean Application No. 10-2010-7016587, mailed Apr. 26, 2012.
Office Action for Japanese Application No. 2010-540703, mailed Nov. 22, 2011.
Office Action for Chinese Application No. 200880122959.5, mailed Mar. 19, 2012.

* cited by examiner

MULTI-PROTOCOL I/O INTERCONNECT ARCHITECTURE

TECHNICAL FIELD

Embodiments of the present disclosure relate generally to multi-protocol tunneling across a multi-protocol I/O interconnect of a computer apparatus.

BACKGROUND

Conventional computer platform architectures include a variety of host controllers to implement a number of different types of I/O between computer platforms and peripheral devices that are connected to the platforms, and these computer platforms generally include protocol-specific connection interfaces that connect to the peripheral devices via protocol-specific plugs and cables. For example, a computer may include one or more of a USB-specific controller that connects to a peripheral device via a USB-specific connection interface, a display-specific controller (e.g., DisplayPort) that connects to a peripheral device via a display-specific connection interface, a PCI Express®-controller that connects to a peripheral device via a PCI Express®-specific connection interface, and so on.

BRIEF DESCRIPTION OF THE DRAWINGS

Embodiments of the present disclosure will be described by way of example embodiments, but not limitations, illustrated in the accompanying drawings in which like references denote similar elements, and in which:

FIG. 8 describes a format of a route string for routing configuration packets in a domain, in accordance with various embodiments of the present disclosure.

FIG. 9 describes a format of a topology ID configuration register, in accordance with various embodiments of the present disclosure.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B).

The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Figure 1:
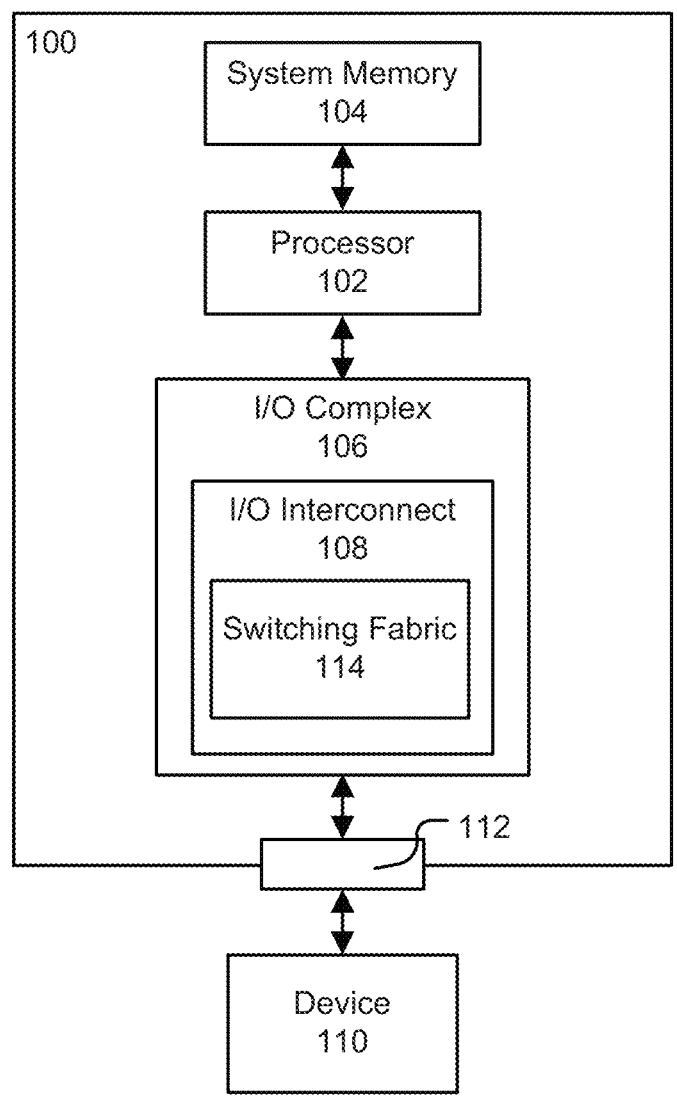
FIG. 1 describes a computer apparatus including a multi-protocol tunneling I/O interconnect, in accordance with various embodiments of the present disclosure.

FIG. 1 describes a computer apparatus 100 including a multi-protocol tunneling I/O interconnect 108 in accordance with various embodiments. In many embodiments, the computer apparatus 100 may include one or more processors 102. In different embodiments, the one or more processors 102 may include one core or multiple cores. In some embodiments, the apparatus 100 may be a multiprocessor system (not shown) where each of the processors has one core or multiple cores.

As shown in FIG. 1, the one or more processors 102 may be operatively coupled to system memory 104 through one or more links (e.g., interconnects, buses, etc). System memory 104 may be capable of storing information that the one or more processors 100 utilizes to operate and execute programs and operating systems. In different embodiments, system memory 104 may be any usable type of readable and writeable memory such as a form of dynamic random access memory (DRAM).

In previously implemented computer apparatuses, an I/O link connecting a peripheral device to a computer system is protocol-specific with a protocol-specific connector port that allows a compatible peripheral device to be attached to the protocol-specific connector port (i.e., a USB keyboard device would be plugged into a USB port, a router device would be plugged into a LAN/Ethernet port, etc.) with a protocol-specific cable. Any single connector port would be limited to peripheral devices with a compatible plug and compatible protocol. Once a compatible peripheral device is plugged into the connector port, a communication link would be established between the peripheral device and a protocol-specific controller.

In the computer apparatus as described in the embodiment shown in FIG. 1, the one or more processors 102 may be operatively coupled to an I/O complex 106, which may house one or more multi-protocol I/O interconnects 108 configured to control one or more I/O links that allow the one or more processors 102 to communicate with one or more I/O peripheral devices 110. For providing the multi-protocol capability, at least in part, the I/O interconnect 108 may include a multi-protocol switching fabric 114 configured to carry multiple I/O protocols. In various embodiments, the multi-protocol switching fabric 114 may comprise a plurality of cross-bar switches. Examples of I/O peripheral devices 110 may include a display device, a keyboard device, an expansion port, a desktop or mobile computer system, or a router, among other devices.

A non-protocol-specific connector port 112 may be configured to couple the I/O interconnect 108 with a connector port (not shown) of the device 110, allowing multiple device types to attach to the computer system 100 through a single physical connector port 112. Moreover, the I/O link between the device 110 and the I/O complex 106 may be configured to carry multiple I/O protocols (e.g., PCI Express®, USB, DisplayPort, HDMI®, etc.) simultaneously. In various embodiments, the connector port 112 may be capable of providing the full bandwidth of the link in both directions with no sharing of bandwidth between ports or between upstream and downstream directions. In various embodiments, the connection between the I/O interconnect 108 and the device 110 may support electrical connections, optical connections, or both.

Figure 2:
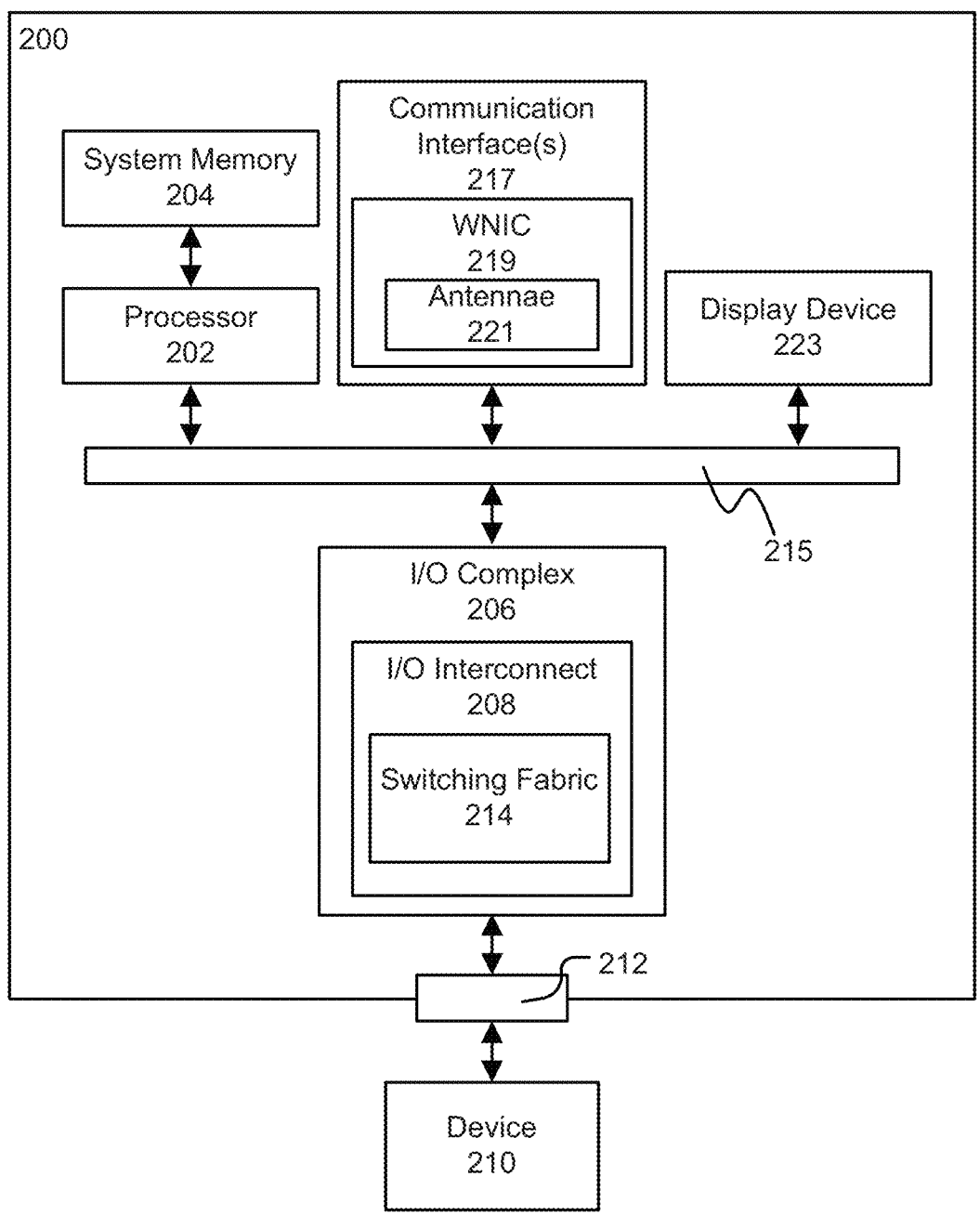
FIG. 2 describes a computer system including a multi-protocol tunneling I/O interconnect, in accordance with various embodiments of the present disclosure.

The apparatus 100 may be a stand-alone device or may be incorporated into various systems including, but not limited to, various computing and/or consumer electronic devices/appliances, such as desktop computing device, a mobile computing device (e.g., a laptop computing device, a handheld computing device, a tablet, a netbook, etc.), mobile phones, smart phones, personal digital assistants, servers, workstations, set-top boxes, digital reorders, game consoles, digital media players, and digital cameras. A block diagram of an example system 200 is illustrated in FIG. 2. The system 200 may comprise one or more processor(s) 202, system memory 204, and an I/O complex 206, all operatively coupled by a bus 115. The I/O complex 206 may include one or more multi-protocol I/O interconnects 208, each of which include a switching fabric 214 and control one or more I/O links that allow the one or more processors 202 to communicate with one or more I/O peripheral devices 210. In various embodiments, the system 200 may have more or fewer components, and/or different architectures.

The system 200 may include communications interface(s) 217 operatively coupled to the bus 215 to provide an interface for system 200 to communicate over one or more networks and/or with any other suitable device. The communications interface(s) 217 may include any suitable hardware and/or firmware. The communications interface(s) 217 for one embodiment may include, for example, a network adapter, a wireless network adapter, a telephone modem, and/or a wireless modem. For wireless communications, the communications interface(s) 217 for one embodiment may include a wireless network interface controller 219 having one or more antennae 221 to establish and maintain a wireless communication link with one or more components of a wireless network. The system 200 may wirelessly communicate with the one or more components of the wireless network in accordance with any of one or more wireless network standards and/or protocols.

The system 100 may include a display device 223, such as, for example, a cathode ray tube (CRT), liquid crystal display (LCD), light emitting diode (LED), or other suitable display device, operatively coupled to the bus 215 for displaying information. In various embodiments, the display device 223 may be a peripheral device interconnected with the system 200. In various ones of these embodiments, such a peripheral display device may be interconnected with the I/O complex 206 by way of the multi-protocol port 212.

Figure 3:
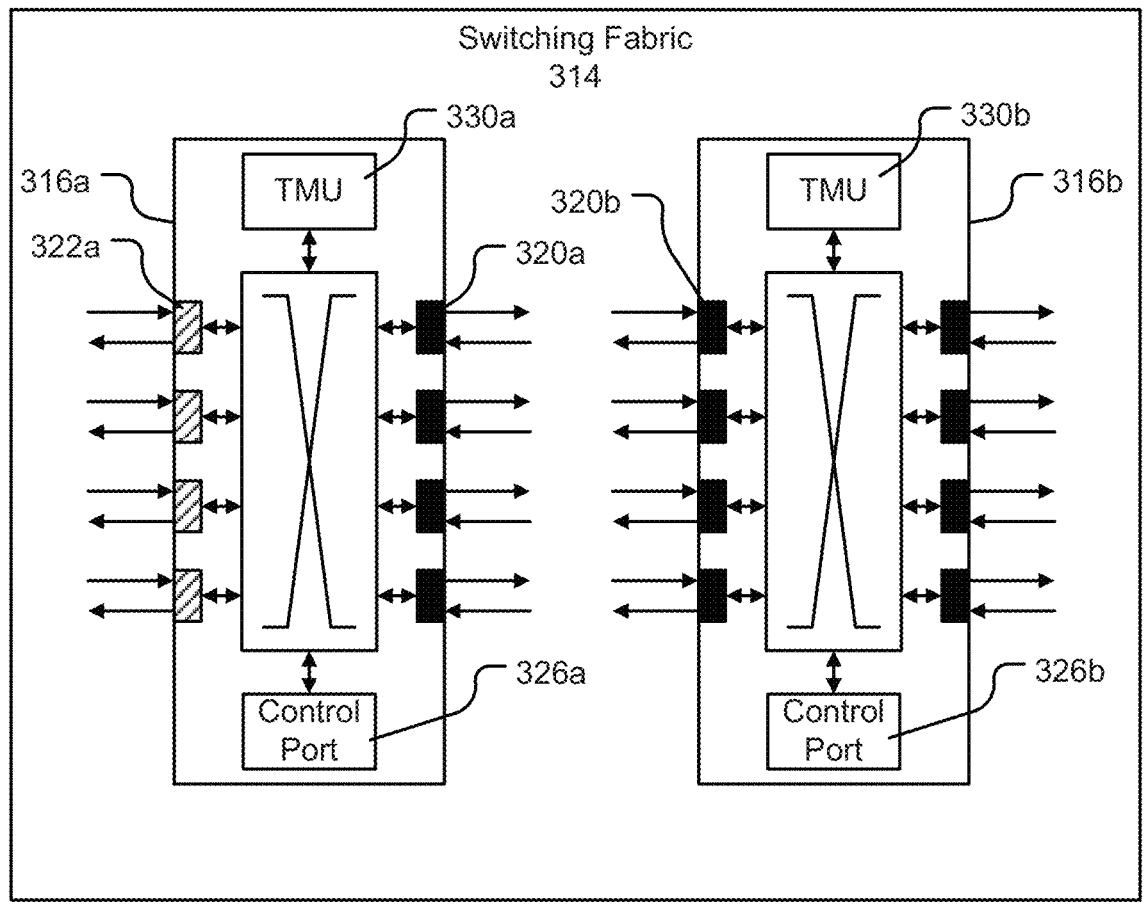
FIG. 3 describes a switching fabric of a multi-protocol tunneling I/O interconnect, in accordance with various embodiments of the present disclosure.

As described herein, for providing an I/O interconnect capable of carrying multiple I/O protocols, one or more of the various I/O interconnects described herein may include, among other things, a multi-protocol switching fabric 314 comprising a plurality of cross-bar switches, as shown in FIG. 3. The multi-protocol switching fabric 314 may be similar to other multi-protocol switching fabrics described herein. In general, the switches 316a, 316b are devices comprising multiple ports 320s, 320b, 322a with the ability to route a packet from any input port to any output port. In various embodiments, the switches 316a, 316b may comprise any number of ports 320s, 320b, 322a, with each additionally including an internal control port 326a, 326b. The switches 316a, 316b may each optionally include a time management unit 330a, 330b for use in distributing and synchronizing time throughout the multi-protocol switching fabric 314, as described more fully herein.

Switch 316a may represent a first type of switch including null ports 320a configured to connect to a single optical or electrical link, while adapter ports 322a may be configured to connect to one or more mapped I/O protocol links. The adapter ports 322a may be used to connect mapped I/O protocol entities to the multi-protocol switching fabric 314. As used herein, the term "adapter" may be used to refer to the protocol adaptation function that may be built into the switch port to encapsulate the mapped I/O protocol packets into I/O packets that flow over the multi-protocol switching fabric 314.

Switch 316b may represent a second type of switch including only null ports 320b (like null ports 320a) configured to connect to a single optical or electrical link.

Although the switches 316a, 316b depicted in FIG. 3 each include four adapter ports 322a and four null ports 320a, 320b, the actual number of ports 320a, 320b, 322a may be fewer or more than that shown. In order to provide connectivity between switches 316a, 316b, a switch implementation generally minimally includes either at least one null port and at least one adapter port, or at least two null ports.

In various embodiments, the multi-protocol switching fabric 314 may comprise one or more of the first type of switches 316a and one or more of the second type of switches 316b.

For implementing various multi-protocol tunneling between adapter ports of a switching fabric within the scope of the present disclosure, a connection manager (not illustrated) may be provided. The connection manager may be implemented in software, firmware, as logic within an I/O complex, as part of a system BIOS, or within an operating system running on a computer apparatus or system in which the I/O complex is included.

Figure 4:
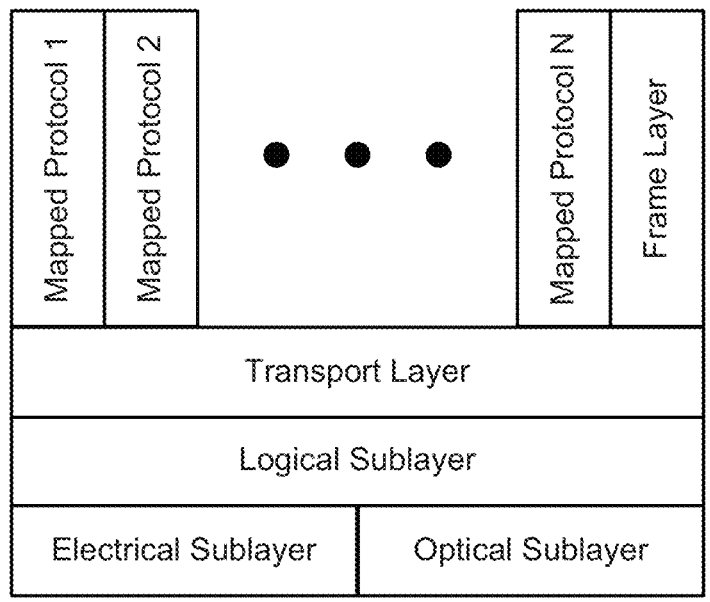
FIG. 4 describes a protocol stack for a multi-protocol interconnect architecture of an I/O complex, in accordance with various embodiments of the present disclosure.

An example protocol stack for the multi-protocol interconnect architecture of an I/O complex is shown in FIG. 4. The electrical and optical sublayers, the logical sublayer, the transport layer, and the frame layer may define the base multi-protocol interconnect architecture of the I/O complex, in which the physical layer comprises the electrical, optical, and logical sublayers. The mapped protocol layers may describe the mapping of the specific I/O protocols onto the multi-protocol interconnect architecture.

In various embodiments, and with reference to FIG. 3 and FIG. 4, the transport layer may be implemented by all ports 320a, 320b, 322a of the switches 316a, 316b of the multi-protocol switching fabric 314, the physical layer may be implemented by all null ports 320a, 320b, and the adapter ports 322a may implement a single mapped protocol layer or the frame layer.

Figure 5:
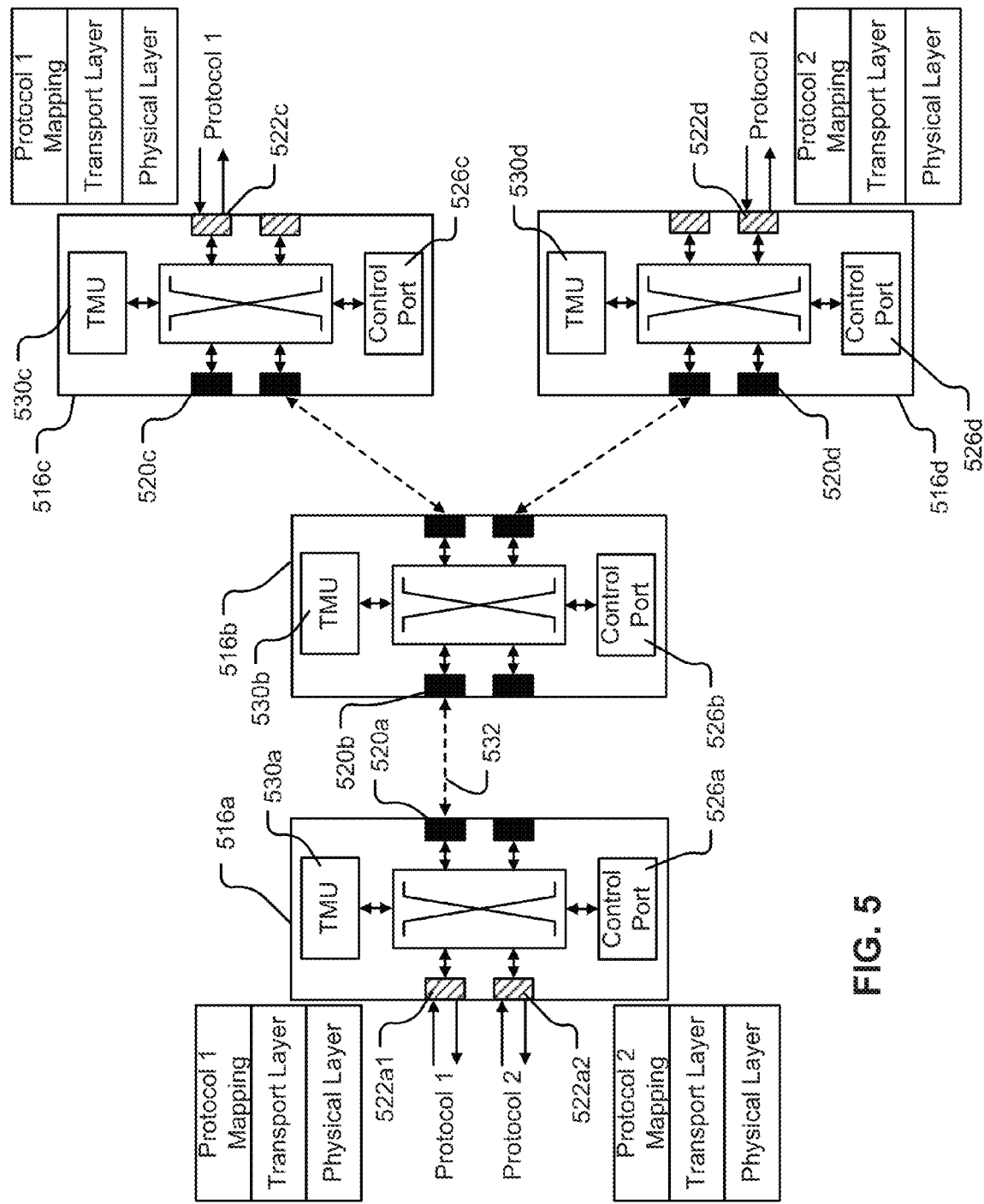
FIG. 5 describes an implementation of a protocol stack for a multi-protocol interconnect architecture of an I/O complex, in accordance with various embodiments of the present disclosure.

An example implementation of the protocol layering is shown in FIG. 5. In the example shown, two protocols are implemented using switches 516a, 516b, 516c, 516d. Each of the switches 516a, 516b, 516c, 516d include control ports 526a, 526b, 526c, 526d, and time management units 530a, 530b, 530c, 530d.

As shown, the adapter ports 522a1, 522c implement a first protocol layer (or frame layer) "protocol 1," and adapter ports 522a2, 522d implement a second protocol layer (or frame layer) "protocol 2." All ports implement the transport layer, while the physical layer is implemented by all null ports 520a, 520b, 520c, 520d.

As such, a link (e.g., link 532) between ports of switches may effectively be shared by multiple paths traversing the fabric between adapter ports of the multi-protocol switching fabric. In various embodiments, the multi-protocol interconnect architecture may be connection-oriented such that a path is configured end-to-end before data transfer takes place. The path may traverse one or more links through the multi-protocol switching fabric, and each hop, the path may be assigned a locally unique identifier that may be carried in the header of all the packets that are associated with the path. In various embodiments, packets belonging to the path may not be reordered within the multi-protocol switching fabric. Buffer allocation (flow control) and Quality of Service may be implemented on a per-path basis. As such, a path may provide virtual-wire semantics for a mapped I/O protocol across the multi-protocol switching fabric.

Figure 6A:
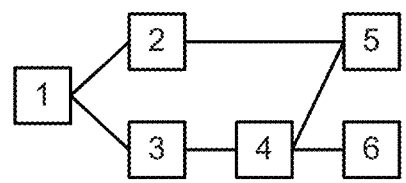
FIG. 6A describes a physical topology of a domain of switches, and FIG. 6B describes an embodiment of a spanning tree for managing the domain of FIG. 6A, in accordance with various embodiments of the present disclosure.
Figure 6B:
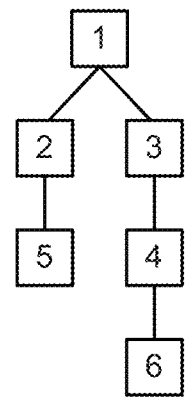

In various embodiments, the physical topology of a collection of switches (a domain) may be an arbitrarily interconnected graph. FIG. 6A shows an example of a physical topology of a domain of switches 1-6. It should be noted that a domain is a management concept rather than an operational one. In various embodiments, a connection manager, as described earlier, may configure the domains of a switching fabric. For further management purposes, a multi-protocol apparatus may be configured to create a spanning tree (by way of the connection manager, for example). FIG. 6B shows an example spanning tree created for managing the domain of FIG. 6A in which the switch 1 at the top of the spanning tree may be referred to as the root switch. It is noted that a spanning tree may include any suitable number of levels. In various embodiments, the maximum number of levels of the spanning tree may be seven.

Figure 7:
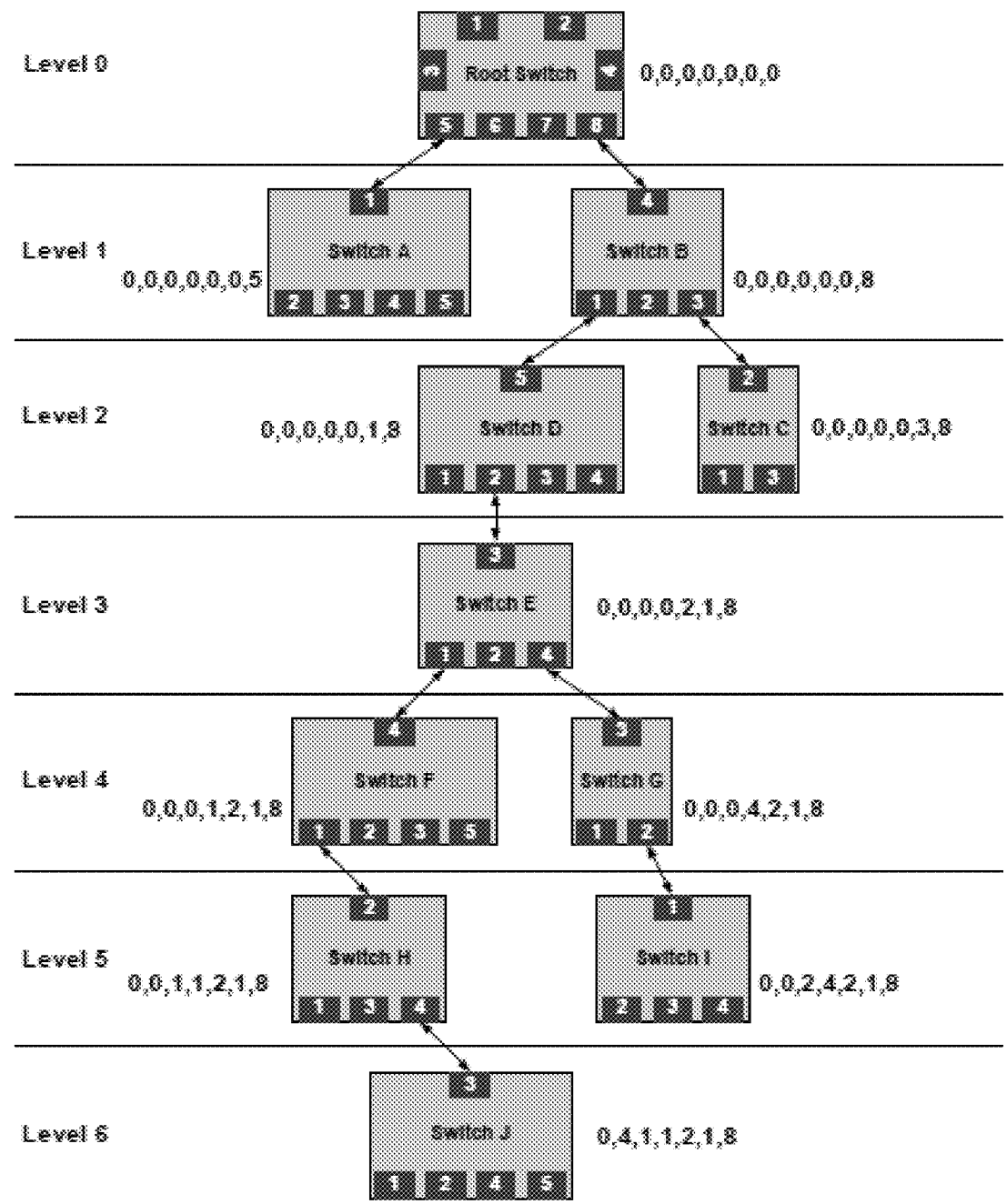
FIG. 7 describes a spanning tree in a domain, in accordance with various embodiments of the present disclosure.

FIG. 7 shows an example of a spanning tree in a domain. Also shown are example assignments of unique topology IDs to each of the switches in the domain. For example, switch J has a topology ID of 0,4,1,1,2,1,8. In various embodiments, unique topology IDs may be assigned to every switch of a domain and each topology ID may represent the position of the switch within the spanning tree of the domain. In various embodiments, the assignment of the topology IDs may be done by the connection manager during inititialization in which the domains may be created by enumerating the switches that are reachable and the topology IDs may be assigned for each switch.

As shown in FIG. 7, the domain includes seven levels (levels 0-6), and the topology IDs of each of the switches are sequences of seven port numbers representing the egress ports at each level of the tree on the path, from the root switch to itself. The topology ID of a switch at a depth of X (where X is from 0 to 6 in this example) may contain a non-zero port number for levels 0 to X−1. The port number at depth X may be 0 denoting the control port of the switch at depth X. The port numbers from depth X+1 to 6 may be treated as "don't care" and may be set at 0. Thus, in the example shown, the control port at the root switch has a topology ID of 0,0,0,0,0,0,0.

Figures 8, 9:
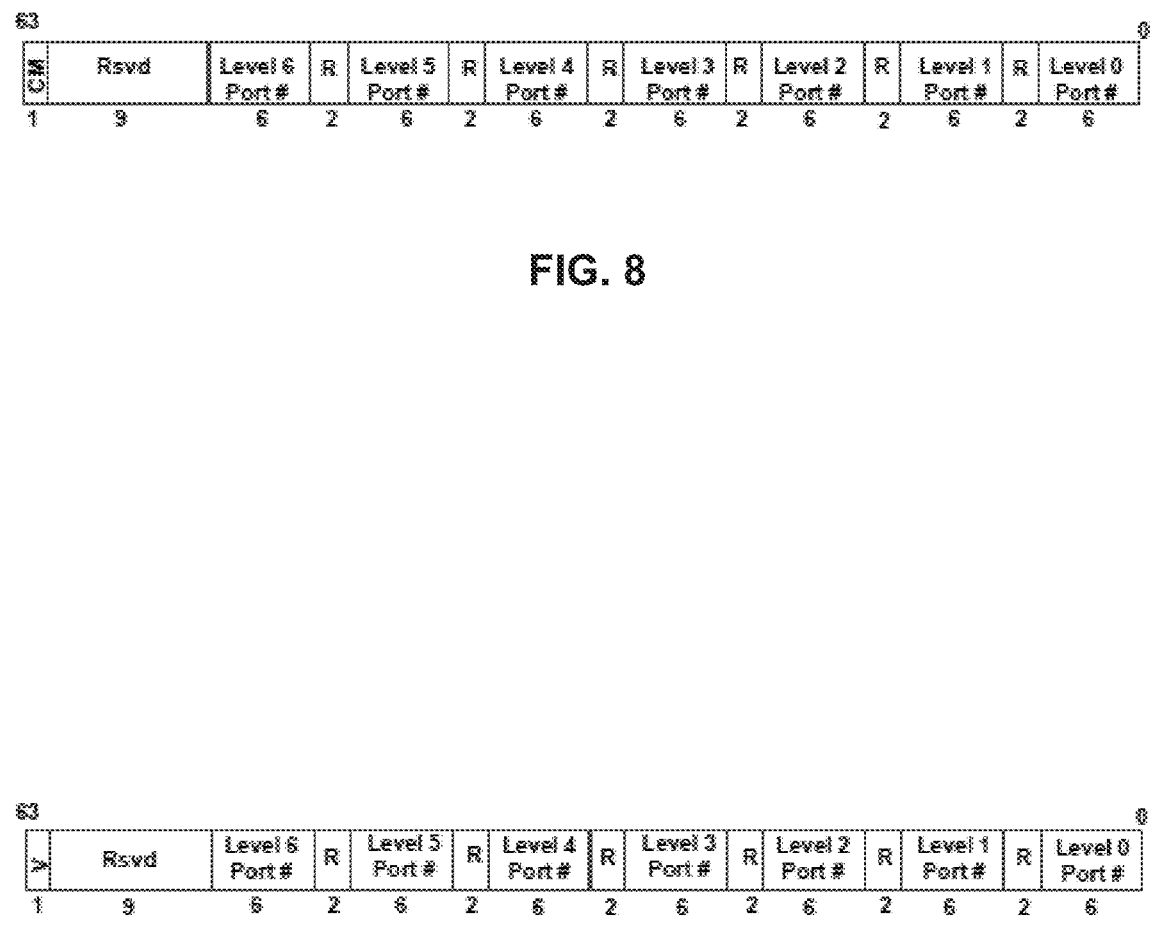

In various embodiments, the routing of configuration packets flowing downstream (in relation to the spanning tree) may be based on the topology ID of the target switch. The configuration packets may be routed in the transport layer packet header. In various embodiments, configuration packets flowing upstream may not use the topology ID and may simply be forwarded over the upstream port of each switch. Typically, every configuration packet carries a route string included in its payload. An example format of the route string is shown in FIG. 8. As shown, the route string may essentially be the topology ID of the switch to which the configuration request is sent or from which the configuration response originates. The MSB bit (CM bit) of the route string may be set to 0 when the configuration message is flowing downstream (from the connection manager to the switch) and set to 1 if the message is flowing in the upstream direction.

In various embodiments, each switch may be configured with its topology ID and its level in the spanning tree by the connection manager. Each switch may also be configured with the port number that points upstream to the connection manager of the domain either through hardware strapping or other similar mechanisms. In various embodiments, the topology ID, depth (in the tree), and upstream facing port may be configuration registers in the switch configuration space of every switch that are initialized by the connection manager during enumeration. An example format of the topology ID configuration register is shown in FIG. 9. For the illustrated example, the MSB of the topology ID may be a valid flag, which may be set to 0 on reset and set to 1 by the connection manager when the topology ID is initialized. The reserved bits of the topology ID may be set to 0.

Configuration packets flowing down the tree may be routed by the control port of a switch in accordance with one or more rules. For example, in various embodiments, the control port of the switch may be required to extract the port from the route string that corresponds to its configured level in the tree. In various embodiments, if the port is 0, the control port may be required to consume the packet. In various embodiments, if the port is non-zero, the control port may be required to forward the packet over the switch port that matches the port extracted from the route string. In various embodiments, configuration packets flowing up the spanning tree may simply be forwarded over the configured upstream facing port.

Figure 10:
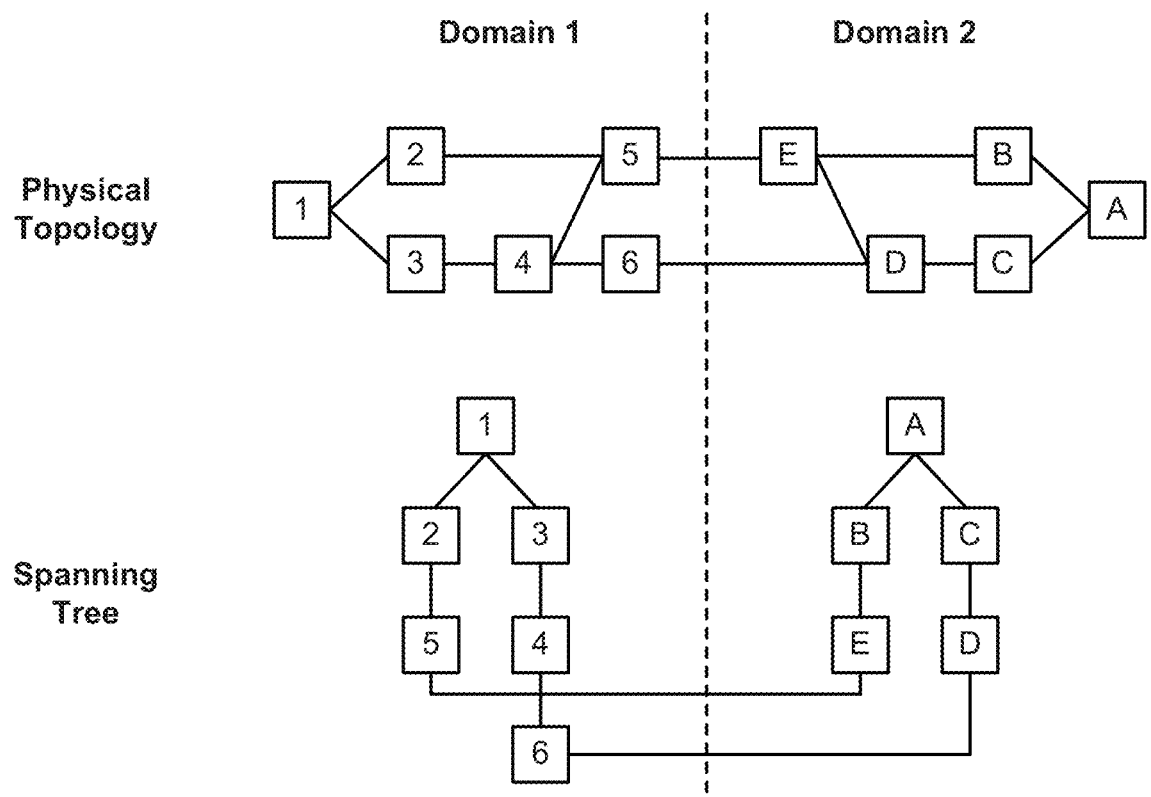
FIG. 10 describes connections that may be established between multiple domains, in accordance with various embodiments of the present disclosure.

Multiple domains may interconnected in various embodiments. FIG. 10 shows example connections that may be established between multiple domains. As shown, switches 1-6 of Domain 1 may be interconnected with switches A-E of Domain 2.

In various embodiments, inter-domain links may be discovered either when the connection manager performs the initial discovery of the topology following power-on or by processing a hot-plug event. A link may be designated to be an inter-domain link when a read of the switch configuration space of the switch across the link results in an ERROR packet being sent that shows that the topology ID field has been previously assigned. When an inter-domain link is discovered, the connection manager may notify system software. The mechanism used to deliver the notification may be implementation-defined.

In various embodiments, the transport layer may only define the routing of inter-domain configuration packets between the two connection managers of the domains that are connected by an inter-domain link. Routing of configuration packets across multiple domains may be controlled by system software. When domains are daisy-chained, configuration packets passing from the originating domain may be delivered to the connection managers of every domain along the path to the target domain. The connection managers of the intermediate domains may pass the configuration packets to the system software which may be responsible for relaying the packet across the inter-domain link towards the target domain.

The routing of inter-domain REQUEST packets may be in accordance with one or more rules. For example, in various embodiments, system software on the originating domain may form REQUEST packet with a route string that points to the egress port of the domain that connects to the inter-domain link over which the packet must be forwarded and the CM bit may be set to 0. The packet may be required to be routed based on the route string at each hop within the domain and forwarded over the egress port across the inter-domain link. At the ingress port of the receiving domain, the control port may remap the route string to point to the ingress port over which the packet was received and the CM bit may be set to 1. In various embodiments, the packet may then be required to be routed to the connection manager of the receiving domain like other intra-domain configuration packets. The packet may be required to be delivered by the connection manager of the receiving domain to system software.

The routing of inter-domain RESPONSE packets may follow one or more of the same steps above. In various embodiments, system software that constructs the RESPONSE packet may use the route string in the corresponding REQUEST packet with the CM bit set to 0.

In various embodiments, the transport layer may employ a hierarchical, credit-based flow control scheme with respect to flow through the multi-protocol switching fabric to prevent or minimize overflow of receive buffers due to congestion. In various embodiments, the flow control scheme may allow a receiver to implement various buffer allocation strategies ranging from dedicated buffers per-path to shared buffer pools that are dynamically shared by multiple paths. In various embodiments, flow control may be turned off on a per-path basis. When flow control is turned off for a path, the path may be required to be provisioned with a receive buffer that can hold at least one maximum sized transport layer packet at each link.

Figure 11:
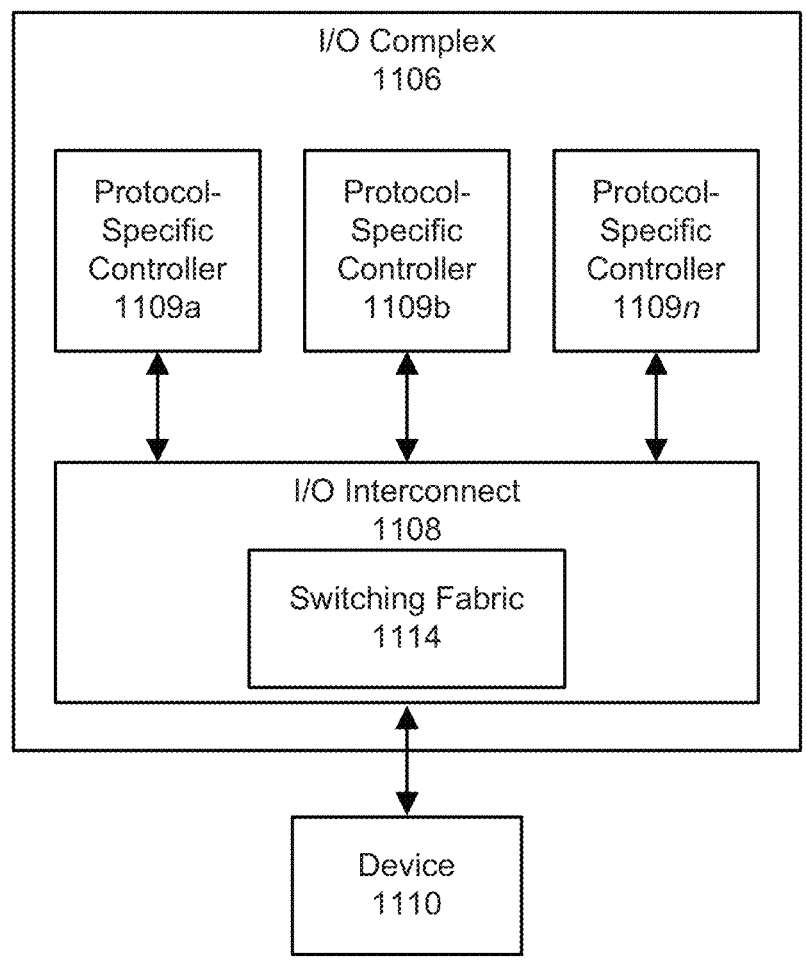
FIG. 11 describes a multi-protocol tunneling I/O complex and interconnect, in accordance with various embodiments of the present disclosure.

FIG. 11 shows an example I/O complex 1106 in accordance with various embodiments. I/O complex 1106 may be similar to the I/O complex 106 of FIG. 1, including an I/O interconnect 1108 configured to couple with a device 1110. The device 1110 may be configured with one or more I/O protocols (e.g., PCI Express®, USB, DisplayPort, HDMI®, etc.).

In various embodiments, the I/O complex 1106 may be configured to connect the device 1110 with one or more protocol-specific controllers 1109a, 1109b, . . . 1109n via the I/O interconnect 1108 in order to tunnel multiple I/O protocols over a common link in a manner that is transparent to the OS software stacks of tunneled I/O protocols. The protocol-specific controllers 1109a, 1109b, . . . 1109n may be configured to then communicate with respective protocol-specific drivers in the OS for configuring the device 1110 as if the device 1110 was directly connected with the protocol-specific controller 1109a, 1109b, . . . 1109n.

Figure 12:
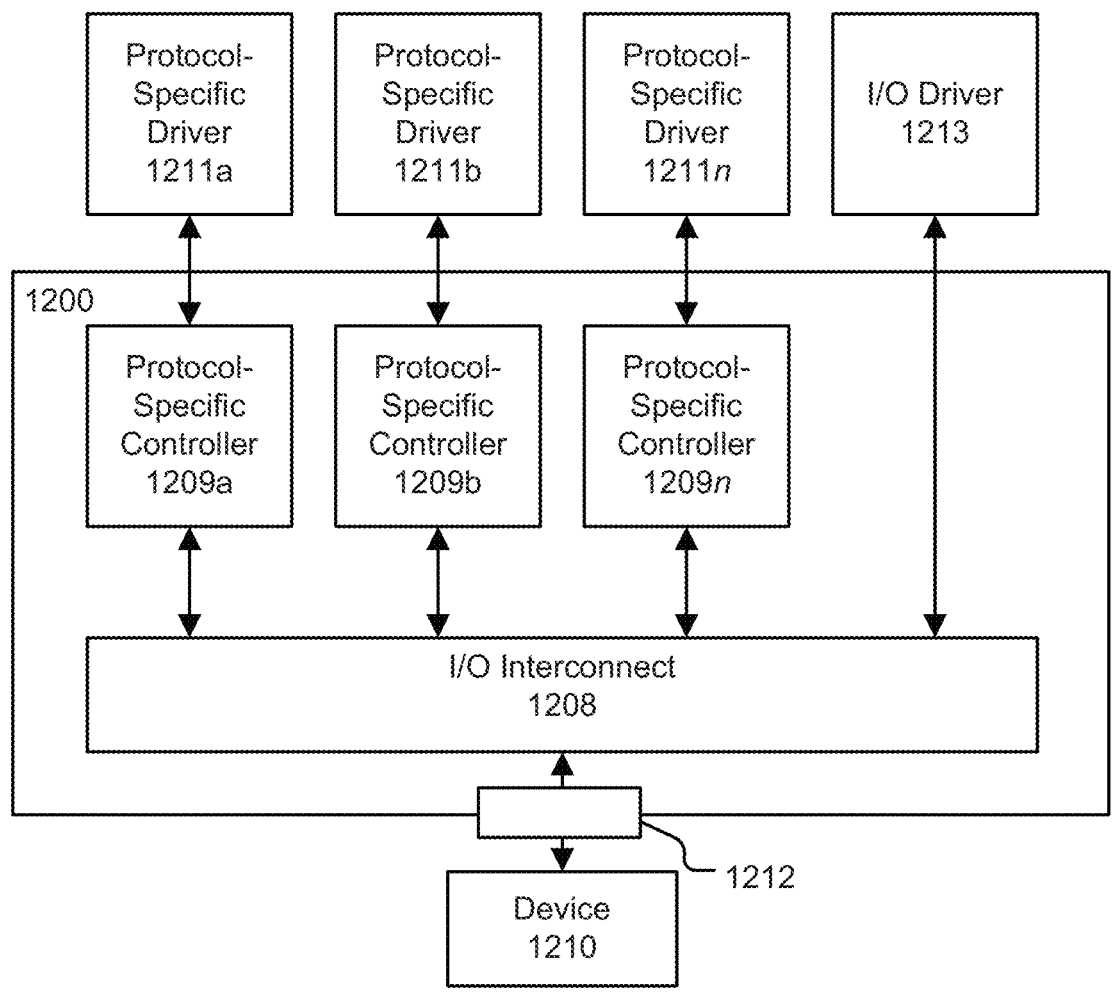
FIG. 12 describes a multi-protocol tunneling I/O complex and interconnect, in accordance with various embodiments of the present disclosure.

FIG. 12 shows an example hardware and software implementation of a multi-protocol apparatus (such as apparatus 100 of FIG. 1, for example) configured to tunnel multiple I/O protocols over a common link in a manner that is transparent to operating system software stacks of tunneled I/O protocols. In various embodiments, a multi-protocol apparatus may employ a multi-level hot-plug signaling scheme to support the tunneling of multiple I/O protocols over a common interconnect in a software-transparent manner.

For the implementation shown in FIG. 12, an I/O hot-plug indication may be sent by the I/O interconnect 1208 to the I/O driver in the OS (or to embedded I/O firmware) when the device 1210 is plugged into the non-protocol-specific connector port 1212 of the apparatus 1200. The hot-plug indication may then be processed by the I/O driver 1213 in the OS/firmware, resulting in communication path(s) being established between the I/O interconnect 1208 and the device 1210. In various embodiments, establishing communication path(s) may include configuring one or more paths between a source adapter and a destination adapter in a domain (described more fully elsewhere). Once the path(s) are established, mapped I/O protocol-specific configuration may be performed in which a protocol-specific hot-plug indication may be sent by the associated protocol-specific controller 1209a, 1209b, . . . 1209n to the respective protocol-specific driver 1211a, 1211b, . . . 1211n in the OS/firmware. The protocol-specific driver 1211a, 1211b, . . . 1211n may then configure the associated protocol-specific controller 1209a, 1209b, . . . 1209n as if the device 1210 was directly connected with the protocol-specific controller 1209a, 1209b, . . . 1209n. At this point, the peripheral device 1210 may be visible to system software and configured to be used by applications.

In various embodiments, the apparatus 1200 may be configured such that when the device 1210 is disconnected from the port 1212, a reverse sequence of events may occur. Specifically, the protocol-specific drivers 1211a, 1211b, . . . 1211n may process the protocol-specific unplug event, and then after the protocol-specific processing, the I/O driver 1213 may process the I/O unplug event.

Peripheral devices described herein (device 110, 210, 1110, or 1210, for example) may be any one of various types of devices, as noted earlier. In various embodiments, the peripheral device may be an expansion port (or other multi-protocol peripheral device) with which one or more other devices, with one or more I/O protocols, may be coupled. For example, for embodiments in which the peripheral device is an expansion port, the device may be simultaneously coupled with a PCI Express® device and a DisplayPort device, which may be coupled with an I/O complex through the expansion port device. In another example, the peripheral device may be a mobile or desktop computer system and one or more other devices may be coupled with the mobile or desktop computer system and with the I/O complex through the device. In various embodiments, multiple peripheral devices may be coupled together by daisy chaining the devices together.

Figure 13:
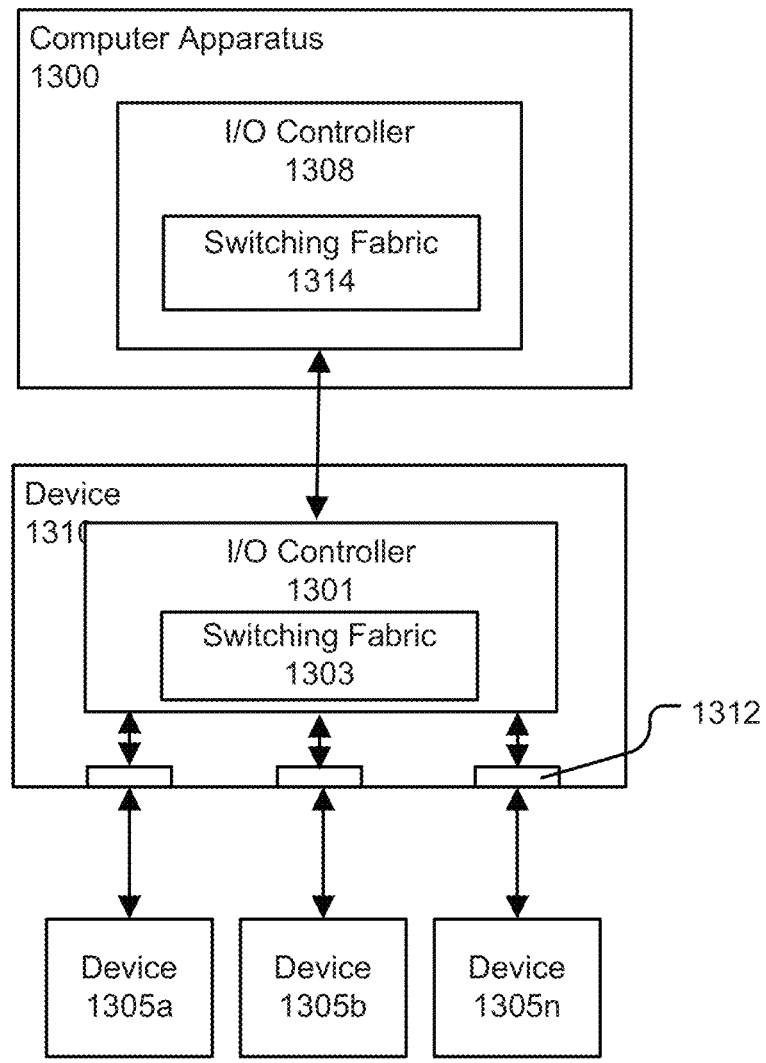
FIG. 13 describes a device (e.g., a peripheral device) including a multi-protocol tunneling I/O interconnect connected with a multi-protocol tunneling I/O interconnect, both in accordance with various embodiments of the present disclosure.

In various embodiments, the peripheral device and/or the other devices coupled with the peripheral device may also include an I/O interconnect similar to one or more of the I/O interconnects 108, 208, 1108, 1208 described herein. As shown in FIG. 13, for example, a device 1310 including a multi-protocol interconnect 1301, which in turn includes a multi-protocol switching fabric 1303, may be configured to be interconnected with a multi-protocol apparatus 1300 which also includes a multi-protocol interconnect 1308 and switching fabric 1314. One or more other peripheral devices 1305a, 1305b, . . . 1305n may be interconnected with the I/O interconnect 1301 via one or more corresponding non-protocol-specific ports 1312.

As noted herein, various embodiments of I/O complexes and apparatuses including I/O complexes may be configured to tunnel a multiple protocols across a multi-protocol interconnect in a software-transparent manner or substantially transparent manner. Specific examples of DisplayPort and HDMI® tunneling techniques will now be described in further detail with reference to FIGS. 14-20.

Figure 14:
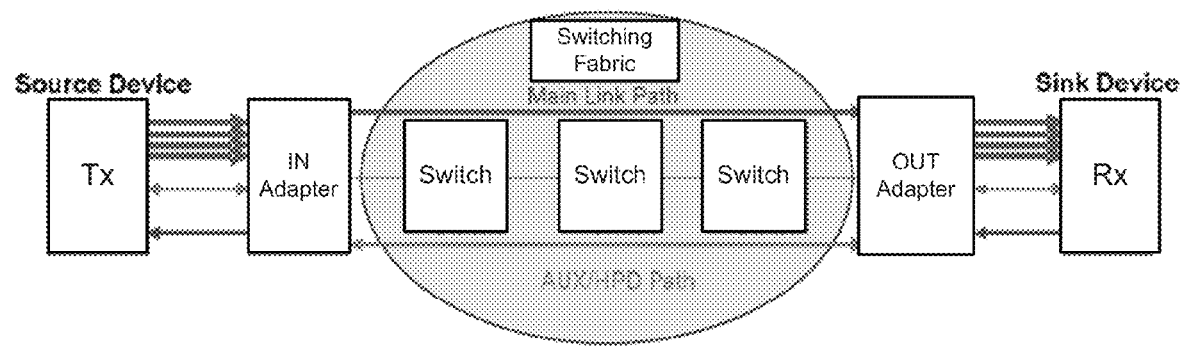
FIG. 14 shows an architecture for mapping a DisplayPort stream over a multi-protocol switching fabric, in accordance with various embodiments of the present disclosure.

FIG. 14 shows an example architecture for mapping a DisplayPort stream over a multi-protocol switching fabric described herein. The architectural model used for mapping DisplayPort may be that of a virtual wire between the DisplayPort source and the DisplayPort sink. The DisplayPort map may behave as a DisplayPort cable replacement and may therefore be completely transparent to the DisplayPort link from a source and sink (and software stack). The DisplayPort IN adapter may terminate a DisplayPort link from a source device and encapsulate DisplayPort main link and AUZ channel transmissions inside packets and transport them across the switch network. At the other end of the network, a DisplayPort OUT adapter may decapsulate the video and AUX channel data and recreate a DisplayPort link that connects to a sink device. Hot plug detect (HPD) indications may also be transmitted as packets.

Figure 15:
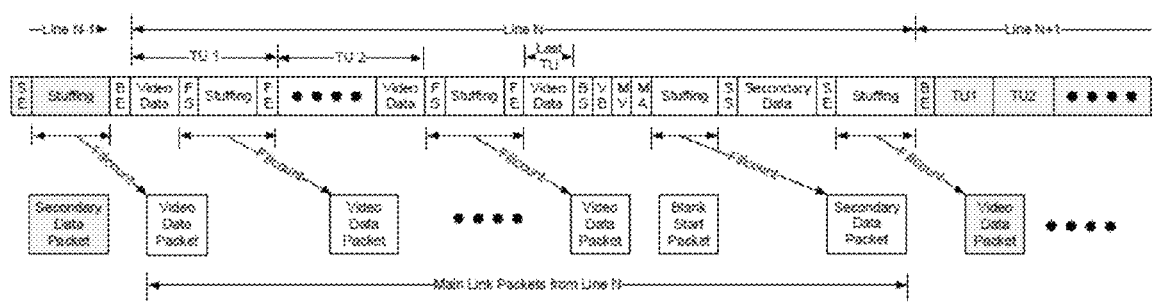
FIG. 15 shows a structure of a scan line and the packetization performed by the DisplayPort IN adapter, in accordance with various embodiments of the present disclosure.

In various embodiments, when a DisplayPort link is mapped onto a multi-protocol switching fabric described herein, the continuous main link data stream may be converted into multiple types of I/O packets. FIG. 15 shows an example structure of a scan line and the packetization performed by the DisplayPort IN adapter. During the packetization, all the stuffing symbols (within a transfer unit TU of active pixel data and during the blanking periods) may be discarded by the DisplayPort IN adapter and may be recreated by the DisplayPort OUT adapter. In order to enable accurate reconstruction of the stuffing at the DisplayPort OUT adapter, the DisplayPort IN adapter may include with each I/O packet a Fill Count field that may specify the number of stuffing symbols that were discarded immediately preceding the current packet as shown.

In various embodiments, AUX channel requests may be packetized and sent as I/O packets across the multi-protocol switching fabric by the DisplayPort IN adapter and may be replayed by the DisplayPort OUT adapter at the other end. AUX channel responses may be packetized and sent as I/O packets across the multi-protocol switching fabric by the DisplayPort OUT adapter and may be replayed by the DisplayPort IN adapter at the other end.

In various embodiments, HPD indications may be packetized and sent as I/O packets across the multi-protocol switching fabric by the DisplayPort OUT adapter and may be replayed by the DisplayPort IN adapter at the other end.

Figure 16:
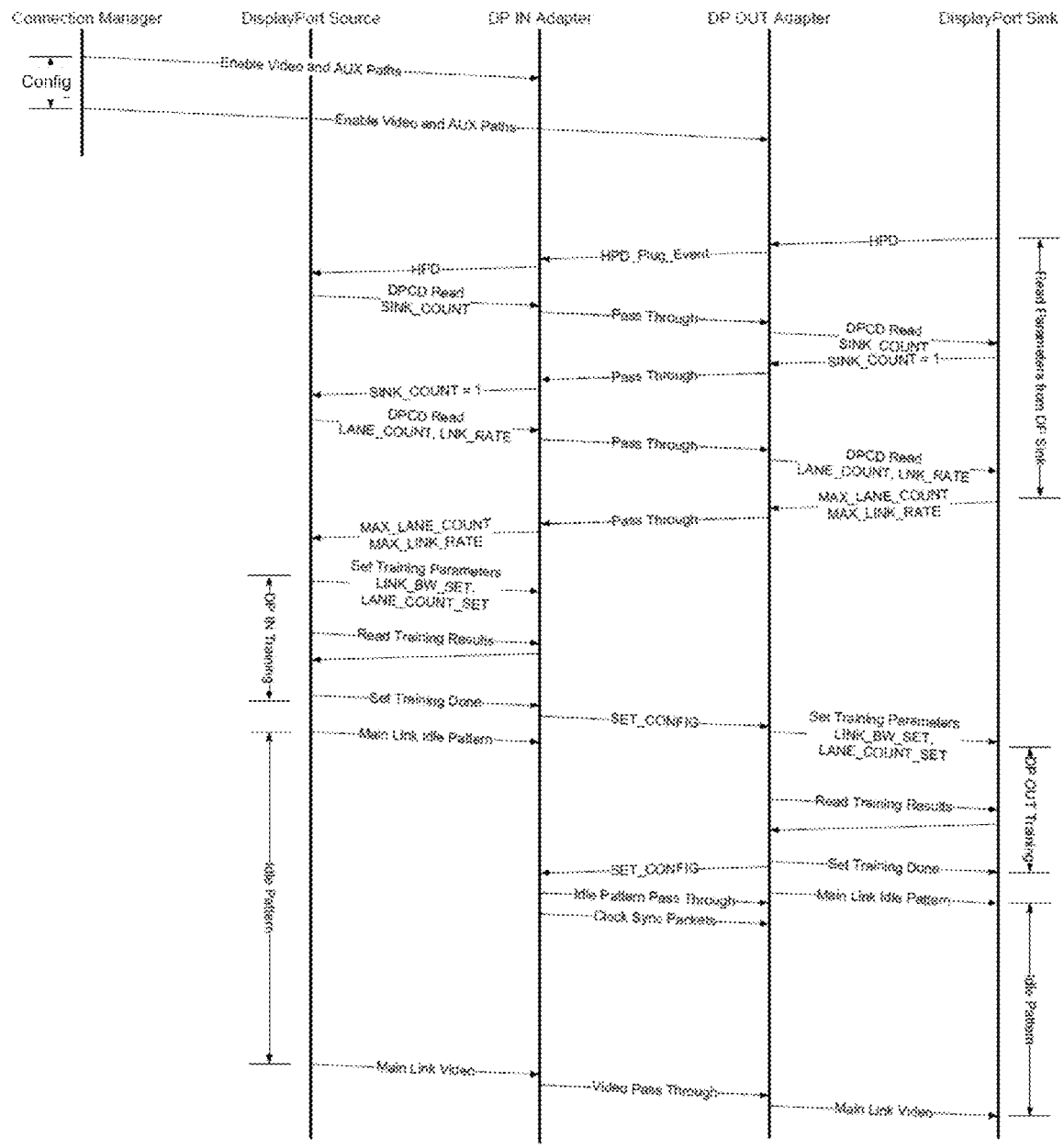
FIG. 16 shows a link initialization sequence of DisplayPort link training, in accordance with various embodiments of the present disclosure.

DisplayPort link training may be initiated by a graphics processing unit (GPU, not illustrated) over the AUX channel and may be carried out in such a way that the DisplayPort links between the GPU and the DisplayPort IN adapter and between the DisplayPort OUT adapter and the display device get trained to the same configuration. In various embodiments, this may result in that from the GPU perspective, display device hot-plug and uplug operations may be supported in the same way for a display device connected across a multi-protocol switching fabric as for a display device attached locally to the GPU. An example link initialization sequence is shown in FIG. 16 in which training fails at the first attempt and the DisplayPort OUT adapter is forced to select a reduced bit-rate configuration.

The DisplayPort tunneling architecture described herein may support transparent tunneling of premium content streams over a multi-protocol switching fabric described herein. The multi-protocol switching fabric may appear as a DisplayPort virtual wire directly connecting a High-bandwidth Digital Content Protection (HDCP) transmitter to a HDCP receiver. The HDCP content protection mechanisms may be handled transparently by the multi-protocol switching fabric.

Figure 17:
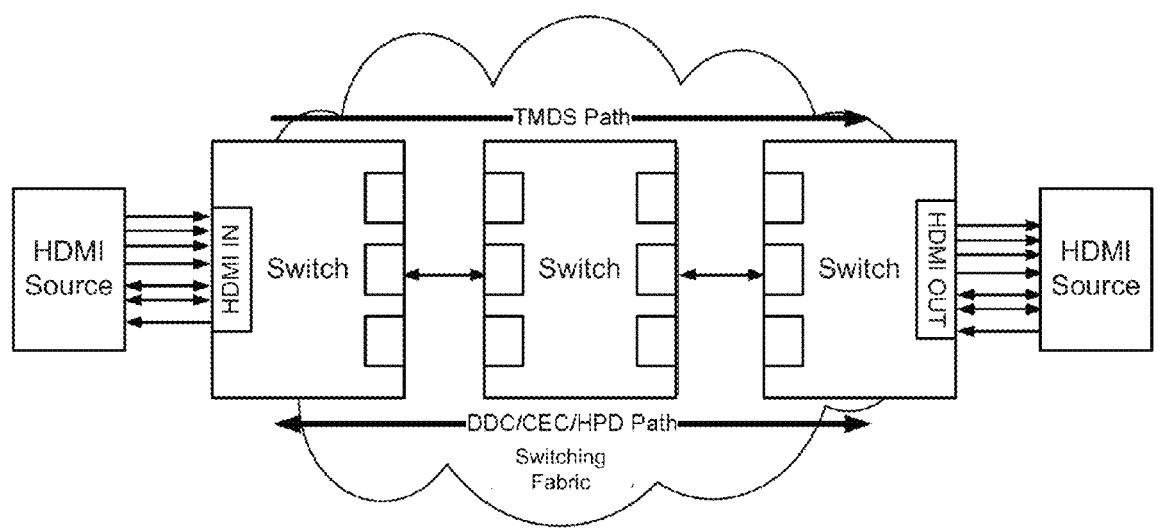
FIG. 17 shows an architecture for mapping an HDMI stream over a multi-protocol switching fabric, in accordance with various embodiments of the present disclosure.

FIG. 17 shows an example architecture for mapping an HDMI stream over a multi-protocol switching fabric described herein. The architectural model used for tunneling HDMI may be that of a virtual wire between an HDMI source and an HDMI sink. The HDMI tunnel may behave as an HDMI cable replacement and may therefore be transparent to the HDMI source and sink (and to the software stack). As shown in FIG. 28, the HDMI IN adapter may terminate an HDMI link from a source device and encapsulate HDMI TMDS link and DDC channel transmissions inside I/O packets and transport them across the switch fabric network. At the other end of the network, an HDMI OUT adapter may decapsulate the TMDS and DDC channel data and recreate an HDMI link that connects to a sink device. HPD indications may also be transmitted as I/O packets.

Figure 18:
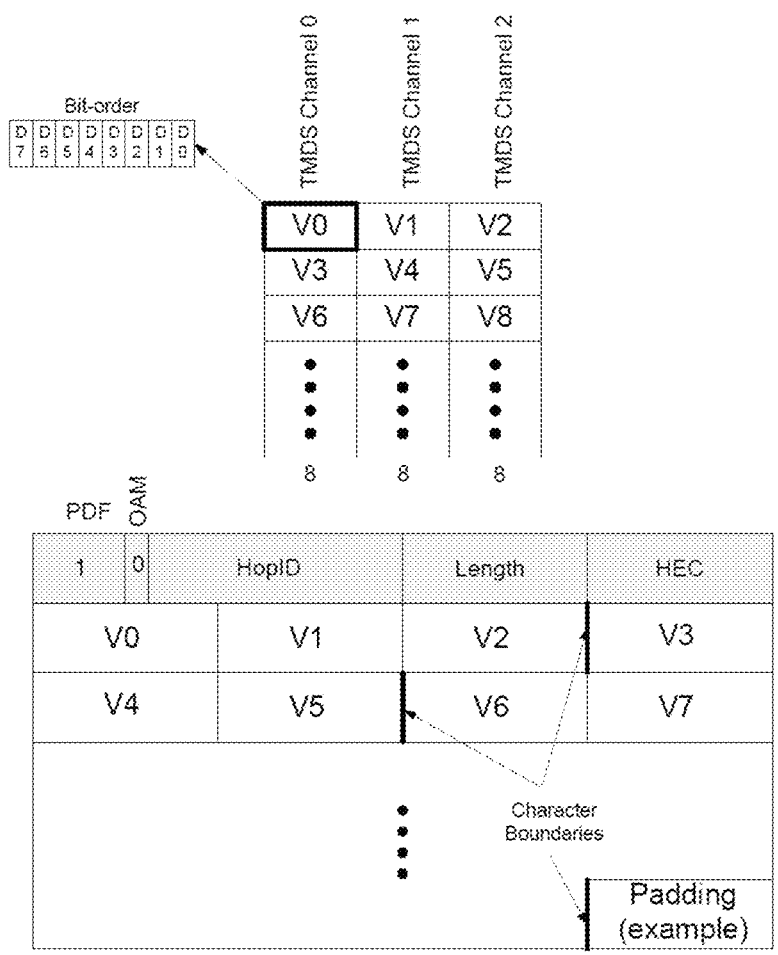
FIG. 18 shows a video island packet format, in accordance with various embodiments of the present disclosure
Figure 19:
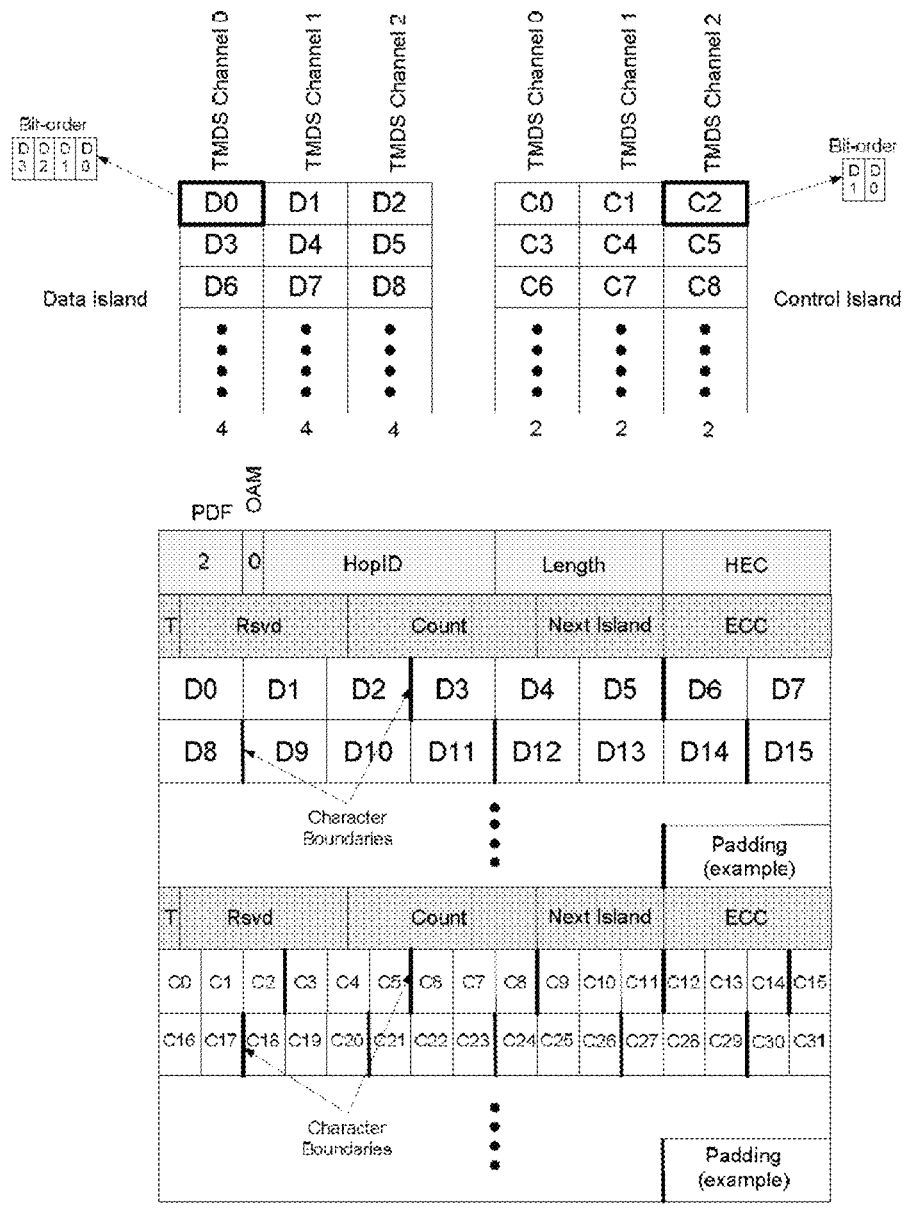
FIG. 19 shows a data/control island packet format, in accordance with various embodiments of the present disclosure

In various embodiments, when an HDMI link is mapped onto a multi-protocol switching fabric described herein, the continuous TMDS link A/V stream may be converted into multiple types of I/O packets. A "video island packet" (carries pixel data) may be used to transport the active pixel data across the multi-protocol switching fabric from the HDMI IN adapter to the HDMI out adapter. Data/control island packets may be used to transport the data and control characters from the HDMI IN adapter to the HDMI OUT adapter. Example video island packet and data/control island packet formats are shown in FIGS. 18 and 19 respectively.

In various embodiments, the HDMI IN adapter may act as a proxy slave device on the bus. The HDMI IN adapter may receive the DDC transaction parameters sent by the HDMI Source and transmit them through the DDC path to the HDMI OUT adapter using a DDC request packet. The HDMI OUT Adapter may act as a proxy master device on the bus and initiate the DDC transaction to the HDMI Sink. When the HDMI Sink responds with data or acknowledgement, the HDMI OUT adapter may transmit the response to the HDMI IN adapter using a DDC response packet. When the HDMI IN adapter receives the DDC Response packet, the HDMI IN adapter may relay the transaction response to the HDMI Source.

In various embodiments, a link initialization may comprise various stages. A multi-protocol apparatus may be configured (e.g., through a software or firmware-based connection manager) to identify the active HDMI IN adapter and HDMI OUT adapter, and optionally, the plug/unplug events. A multi-protocol apparatus may be configured (e.g., through the connection manager) to set and enable paths between the HDMI IN adapter and the HDMI OUT adapter. The source may assert the 5 v signal, and the HDMI IN adapter may pass the indication to the HDMI OUT adapter, which may forward it to the sink (unless already done due to 5VO bit). The sink may respond by asserting HPD. This indication may be forwarded to the HDMI IN adapter, which may forward it to the source. In various embodiments, the HDMI IN Adapter may optionally act as a storing repeater and read the sink before asserting HPD towards the source. When the TMDS link is locked at the HDMI IN adapter, it may send a link_up indication to HDMI OUT adapter (along with the HDMI/DVI state), and TMDS LPK packets and TMU clock sync packets may be sent from this stage. The HDMI OUT adapter may generate the TMDS clock, and when stable, start driving TMDS traffic.

When premium content is streamed, the multi-protocol apparatuses tunneling HDMI may employ content protection using HDCP. The HDMI mapping architecture described herein may support transparent mapping of premium content streams over a multi-protocol switching fabric. The HDMI map may appear as an HDMI link directly connecting an HDCP transmitter to an HDCP receiver. The HDCP content protection mechanisms may be handled transparently.

Figure 20:
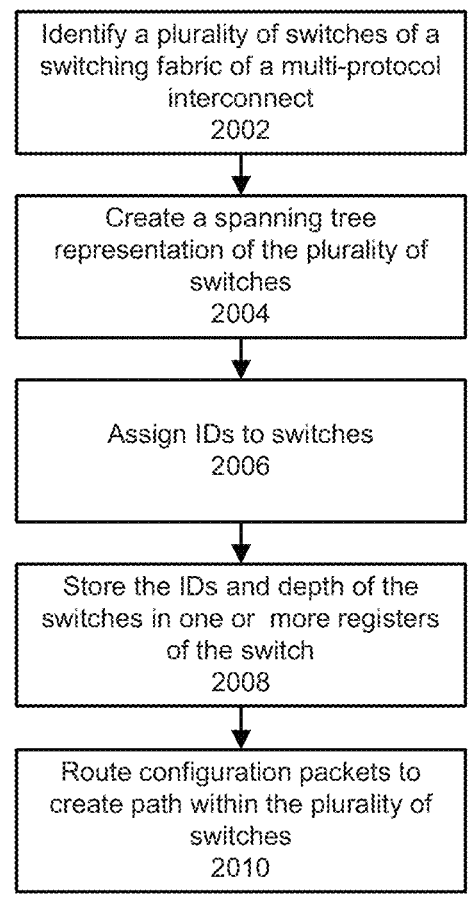
FIG. 20 is a flow diagram of a method for configuring a multi-protocol tunneling I/O interconnect, in accordance with various embodiments of the present disclosure.

FIG. 20 is a flow diagram of an example method 2000 for configuring a multi-protocol tunneling I/O interconnect, in accordance with various embodiments of the present disclosure. The method 2000 may include one or more functions, operations, or actions as is illustrated by blocks 2002-2010.

Processing for the method 2000 may start with block 2002 by identifying a plurality of switches of a switching fabric of a multi-protocol interconnect.

The method 2000 may proceed to block 2004 by creating a spanning tree representation of the plurality of switches.

The method 2000 may proceed to block 2006 by assigning unique identifications (IDs) to the switches of plurality of switches of the spanning tree. In various embodiments, the IDs may represent the relative positions of the switches within the spanning tree.

The method 2000 may proceed to block 2008 by storing the IDs and depth of the switches (in the spanning tree) in one or more registers of each of the switches.

The method 2000 may proceed to block 2010 by routing configuration packets through the spanning tree to the switches based at least in part on their respective IDs.

Figure 21:
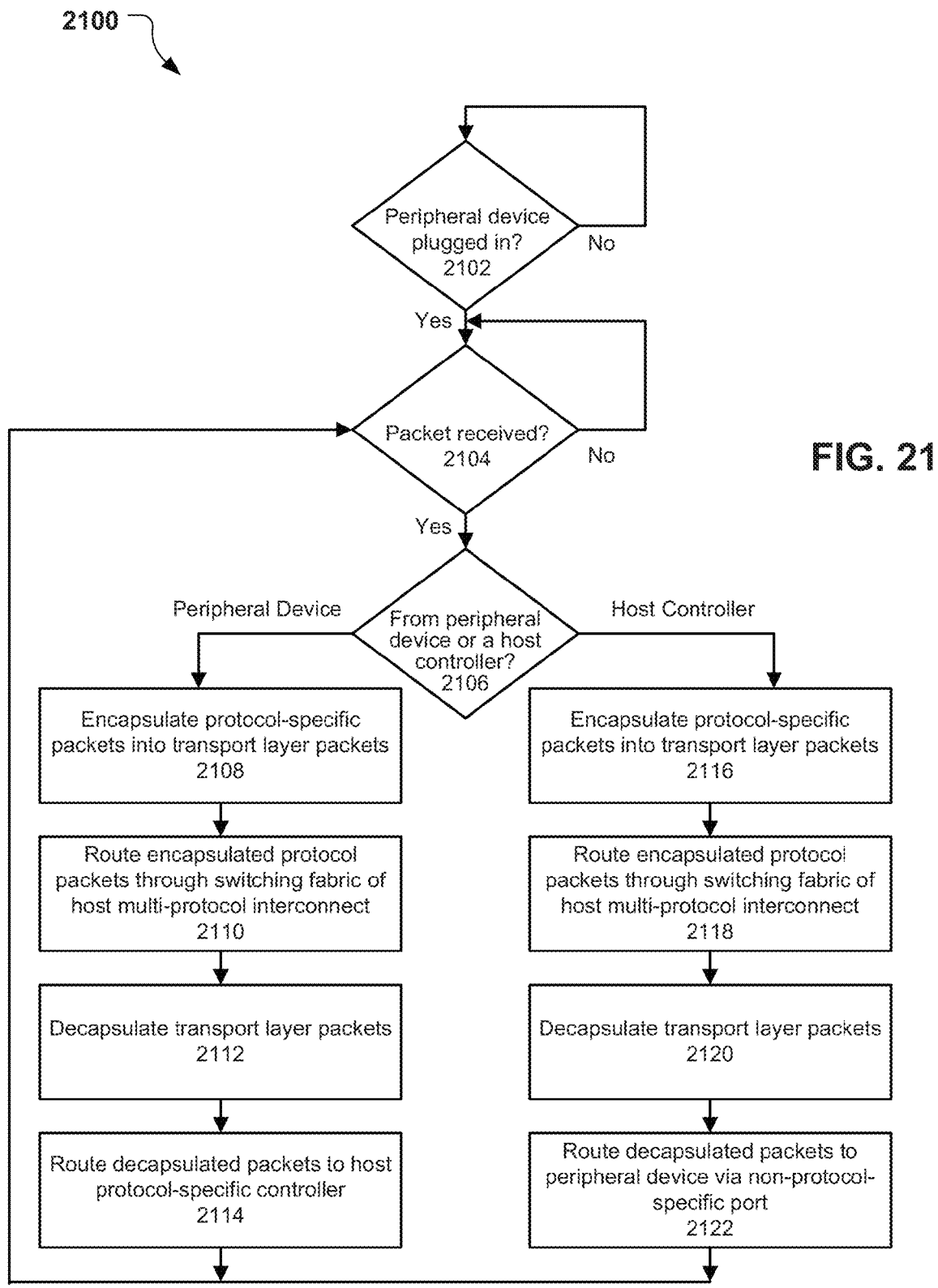
FIG. 21 is a flow diagram of a method for operating a computer apparatus including a multi-protocol tunneling I/O interconnect, in accordance with various embodiments of the present disclosure.

FIG. 21 illustrates an example method for operating a computer apparatus including a multi-protocol tunneling I/O interconnect, in accordance with various embodiments of the present disclosure. The method 2100 may include one or more functions, operations, or actions as is illustrated by blocks 2102-2122.

Processing for the method 2100 may start with block 2102 by determining whether a peripheral device has been plugged into a non-protocol-specific port of a computer apparatus including a multi-protocol tunneling I/O interconnect. Plugging may refer to a peripheral device being directly coupled with the non-protocol-specific port and/or a target peripheral device being directly coupled to some other peripheral device directly coupled with the non-protocol-specific port. In the latter embodiments, one or more other peripheral devices may be operatively disposed between the target peripheral device and the non-protocol-specific port. If no peripheral device has been plugged, then processing in block 2102 may repeat. In various embodiments, the computer apparatus may be configured to issue an interrupt signal indicating when a peripheral device has been plugged (e.g., hot-plugged).

Processing for the method 2100 may proceed to block 2104 by determining whether a data packet has been received. If no data packet has been received, then processing in block 2104 may repeat. In various embodiments, a data packet may be received from the peripheral device or from within the computer apparatus. In various embodiments, data packets within the computer apparatus may be received by the multi-protocol tunneling I/O interconnect from a protocol-specific controller ("host protocol-specific controller") of the computer apparatus.

Processing for the method 2100 may proceed to block 2106 by determining whether the data packet was received from the peripheral device or from a host protocol-specific controller. If no data packet has been received, then processing in block 2106 may repeat.

If the data packet was received from the peripheral device, processing for the method 2100 may proceed to block 2108 by encapsulating packets of a first protocol into first transport layer packets configured to be routed through the switching fabric of the I/O interconnect. In various embodiments, packets of a second protocol, different from the first protocol, may also be encapsulated into second transport layer packets for routing through the switching fabric.

Processing for the method 2100 may proceed to block 2110 by simultaneously routing the first and second transport layer packets through the switching fabric of the I/O interconnect.

Processing for the method 2100 may proceed to block 2112 by decapsulating the transport layer packets. In various embodiments, decapsulation may be performed an adapter port of a switch of the switching fabric.

Processing for the method 2100 may proceed to block 2114 by routing the decapsulated packets to different host protocol-specific controllers of the computer apparatus.

If the data packet was received from the peripheral device, processing for the method 2100 may proceed from block 2106 to block 2116 by encapsulating packets of a first protocol into first transport layer packets configured to be routed through the switching fabric of the I/O interconnect. In various embodiments, packets of a second protocol, different from the first protocol, may also be encapsulated into second transport layer packets for routing through the switching fabric.

Processing for the method 2100 may proceed to block 2118 by simultaneously routing the first and second transport layer packets through the switching fabric of the I/O interconnect.

Processing for the method 2100 may proceed to block 2120 by decapsulating the transport layer packets. In various embodiments, decapsulation may be performed an adapter port of a switch of the switching fabric.

Processing for the method 2100 may proceed to block 2122 by routing the decapsulated packets to a peripheral device via a non-protocol-specific port of the computer apparatus.

Figure 22:
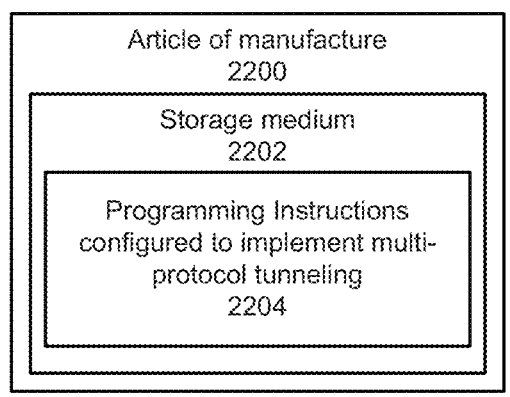
FIG. 22 describes an article of manufacture having programming instructions configured to cause an apparatus to practice some or all aspects of multi-protocol tunneling (of the methods of FIG. 20 and FIG. 21, for example), in accordance with embodiments of the present disclosure.

In various embodiments, an article of manufacture may be employed to implement one or more methods as disclosed herein. FIG. 22 describes an example article of manufacture 2200. As shown, the article of manufacture 2200 may include a computer-readable non-transitory storage medium 2202 and a storage medium 2202. The storage medium 2202 may include programming instructions 2204 configured to cause an apparatus to practice some or all aspects of multi-protocol tunneling, in accordance with embodiments of the present disclosure.

The storage medium 2202 may represent a broad range of persistent storage medium known in the art, including but not limited to flash memory, optical disks or magnetic disks. The programming instructions 2204, in particular, may enable an apparatus, in response to their execution by the apparatus, to perform various operations described herein. For example, the storage medium 2202 may include programming instructions 2204 configured to cause an apparatus to practice some or all aspects of multi-protocol tunneling of the methods of FIG. 20 and FIG. 21, for example, in accordance with embodiments of the present disclosure.

Although various example methods, apparatus, systems, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising,
on a first device comprising a first switch, identifying a plurality of switches of a switching fabric created through the interconnection of a plurality of devices with the first device, wherein the interconnection of the plurality of devices creates more than one path through which data can be transferred from the first device to a second device having a second switch that is part of the plurality of devices; and
configuring a path from a port of the first switch to a port of a second switch of the plurality of switches, wherein configuring a path comprises creating a spanning tree representation of the plurality of switches, wherein the first device is at the root of the spanning tree representation, and wherein configuring a path also comprises assigning a topology identification to the second switch through a configuration packet that is transmitted to configure the path from the first switch through the spanning tree representation ending at the second switch, wherein topology identification represents a relative position of the second switch within the spanning tree representation and wherein the topology identification of the second switch comprises a number assigned to the port of the first switch, wherein the topology identification further comprises a sequence of port numbers representing ports of respective switches on each level of the spanning tree representation, wherein each of the switches of the spanning tree representation is assigned a number of the port of the previous switch of the spanning tree representation, wherein a first number in the sequence corresponds to a port of a root switch of the spanning tree representation, wherein the configuration packet includes a topology identification of a switch to be configured, and further includes a most significant bit (MSB) to indicate whether the configuration packet is to flow from a connection manager associated with the first device, to the second switch, or the configuration packet is to flow from the second switch to the connection manager.

2. The method of claim 1, wherein identifying a plurality of switches and configuring a path occur during initialization or as a result of a hot plug event.

3. The method of claim 1, wherein the spanning tree representation includes no more than seven levels of switches.

4. The method of claim 1, wherein the path is established to route a first and a second packet of data from the first switch to the second switch, wherein the first packet of data comprises data according to a first input/output protocol and the second packet of data comprises data according to a second input/output protocol and the first input/output protocol is different from the second input/output protocol.

5. The method of claim 4, wherein the first and the second input/output protocols are selected from the group consisting of PCI express, USB, DisplayPort, and HDMI.

6. The method of claim 4, wherein the first and the second input/output protocols are routed concurrently.

7. The method of claim 1, wherein the first plurality of switches comprises a first domain and also including identifying a second domain comprised of a second plurality of switches and configuring a second path from a port of the second switch to a port of a third switch of the second domain.

8. At least one non-transitory machine-readable medium storing a plurality of instructions that in response to being executed on a computing device, cause the computing device to carry out a method, the method comprising,
on a first device comprising a first switch, identifying a plurality of switches of a switching fabric created through the interconnection of a plurality of devices with the first device, wherein the interconnection of the plurality of devices creates more than one path through which data can be transferred from the first device to a second device having a second switch that is part of the plurality of devices; and
configuring a path from a port of the first switch to a port of a second switch of the plurality of switches, wherein configuring a path comprises creating a spanning tree representation of the plurality of switches wherein the first device is at the root of the spanning tree representation and wherein configuring a path also comprises assigning a topology identification to the second switch through a configuration packet that is transmitted to configure the path from the first switch through the spanning tree representation ending at the second switch, wherein topology identification represents a relative position of the second switch within the spanning tree representation and wherein the topology identification of the second switch comprises a number assigned to the port of the first switch, wherein the topology identification further comprises a sequence of port numbers representing ports of respective switches on each level of the spanning tree representation, wherein each of the switches of the spanning tree representation is assigned a number of the port of the previous switch of the spanning tree representation, wherein a first number in the sequence corresponds to a port of a root switch of the spanning tree representation, wherein the configuration packet includes a topology identification of a switch to be configured, and further includes a most significant bit (MSB) to indicate whether the configuration packet is to flow from a connection manager associated with the first device, to the second switch, or the configuration packet is to flow from the second switch to the connection manager.

9. The method of claim 8, wherein identifying a plurality of switches and configuring a path occur during initialization or as a result of a hot plug event.

10. The method of claim 8, wherein the spanning tree representation includes no more than seven levels of switches.

11. The method of claim 8, wherein the path is established to route a first and a second packet of data from the first switch to the second switch wherein the first packet of data comprises data according to a first input/output protocol and the second packet of data comprises data according to a second input/output protocol and the first input/output protocol is different from the second input/output protocol.

12. The method of claim 11, wherein the first and the second input/output protocols are selected from the group consisting of PCI express, USB, DisplayPort, and HDMI.

13. The method of claim 11, wherein the first and the second input/output protocols are routed concurrently.

14. The method of claim 8, wherein the first plurality of switches comprises a first domain and also including identifying a second domain comprised of a second plurality of switches and configuring a second path from a port of the second switch to a port of a third switch of the second domain.

15. A first device comprising a multiprotocol interconnect complex and a processor wherein the multiprotocol interconnect complex is operatively coupled to the processor, wherein the multiprotocol interconnect complex comprises a first switch, and wherein the multiprotocol interconnect complex is configured to carry out a method, the method comprising,
    identifying a plurality of switches of a switching fabric created through the interconnection of a plurality of devices comprising switches with the first device comprising the multiprotocol interconnect complex, wherein the interconnection of the plurality of devices creates more than one path through which data can be transferred from the first device comprising the multiprotocol interconnect complex to a second device of the plurality of devices, wherein the second device comprises a second switch;
    configuring a path from a port of the first switch to a port of the second switch, wherein configuring a path comprises creating a spanning tree representation of the plurality of switches, wherein the first device is at the root of the spanning tree representation, and wherein configuring a path also comprises assigning a topology identification to the second switch, through a configuration packet that is transmitted to configure the path from the first switch on the first device through the spanning tree representation ending at the second switch, wherein topology identification represents a relative position of the second switch within the spanning tree representation and wherein the topology identification of the second switch comprises a number assigned to the port of the first switch, wherein the topology identification further comprises a sequence of port numbers representing ports of respective switches on each level of the spanning tree representation, wherein each of the switches of the spanning tree representation is assigned a number of the port of the previous switch of the spanning tree representation, wherein a first number in the sequence corresponds to a port of a root switch of the spanning tree representation, wherein the configuration packet includes a topology identification of a switch to be configured, and further includes a most significant bit (MSB) to indicate whether the configuration packet is to flow from a connection manager associated with the first device, to the second switch, or the configuration packet is to flow from the second switch to the connection manager.

16. The device of claim 15, wherein identifying a plurality of switches and configuring a path occur during initialization or as a result of a hot plug event.

17. The device of claim 15, wherein the spanning tree representation includes no more than seven levels of switches.

18. The device of claim 15, wherein the path is established to route a first and a second packet of data from the first switch to the second switch wherein the first packet of data comprises data according to a first input/output protocol and the second packet of data comprises data according to a second input/output protocol and the first input/output protocol is different from the second input/output protocol.

19. The device of claim 18, wherein the first and the second input/output protocols are selected from the group consisting of PCI express, USB, DisplayPort, and HDMI.

20. The device of claim 18, wherein the first and the second input/output protocols are routed concurrently.

21. The device of claim 15, wherein the first plurality of switches comprises a first domain and also including identifying a second domain comprised of a second plurality of switches and configuring a second path from a port of the second switch to a port of a third switch of the second domain.

22. A method comprising,
    on a device comprising an input/output interconnect comprising a first switch, identifying a plurality of switches of a switching fabric created through the interconnection of a plurality of devices with the device; and
    configuring a path from a port of the first switch to a port of a second switch of the plurality of switches, wherein configuring a path comprises creating a spanning tree representation of the plurality of switches wherein the device is at the root of the spanning tree representation and wherein configuring a path also comprises assigning a topology identification to the second switch through a configuration packet that is transmitted to configure the path from the first switch through the spanning tree representation ending at the second switch, wherein topology identification represents a relative position of the second switch within the spanning tree representation and wherein the topology identification of the second switch comprises a number assigned to the port of the first switch, wherein the topology identification further comprises a sequence of port numbers representing ports of respective switches on each level of the spanning tree representation, wherein each of the switches of the spanning tree representation is assigned a number of the port of the previous switch of the spanning tree representation, wherein a first number in the sequence corresponds to a port of a root switch of the spanning tree representation, wherein the configuration packet includes a topology identification of a switch to be configured, and further includes a most significant bit (MSB) to indicate whether the configuration packet is to flow from a connection manager associated with the first device, to the second switch, or the configuration packet is to flow from the second switch to the connection manager.

23. The method of claim 22, wherein identifying a plurality of switches and configuring a path occur during initialization or as a result of a hot plug event.

24. The method of claim 22, wherein the spanning tree representation includes no more than seven levels of switches.

25. The method of claim 22, wherein the path is established to route a first and a second packet of data from the first switch to the second switch wherein the first packet of data comprises data according to a first input/output protocol and the second packet of data comprises data according to a second input/output protocol and the first input/output protocol is different from the second input/output protocol.

26. The method of claim 25, wherein the first and the second input/output protocols are selected from the group consisting of PCI express, USB, DisplayPort, and HDMI.

27. The method of claim 25, wherein the first and the second input/output protocols are routed concurrently.

28. The method of claim 22, wherein the first plurality of switches comprises a first domain and also including identifying a second domain comprised of a second plurality of switches and configuring a second path from a port of the second switch to a port of a third switch of the second domain.

29. At least one non-transitory machine-readable medium comprising storing a plurality of instructions that in response to being executed on a computing device, cause the computing device to carry out a method, the method comprising, on a device having a first switch, identifying a plurality of switches of a switching fabric created through the interconnection of a plurality of devices with the device; and
configuring a path from a port of the first switch to a port of a second switch of the plurality of switches, wherein configuring a path comprises creating a spanning tree representation of the plurality of switches wherein the device is at the root of the spanning tree representation and wherein configuring a path also comprises assigning a topology identification to the second switch through a configuration packet that is transmitted to configure the path from the first switch through the spanning tree representation ending at the second switch, wherein topology identification represents a relative position of the second switch within the spanning tree representation and wherein the topology identification of the second switch comprises a number assigned to the port of the first switch, wherein the topology identification of a switch of the switching fabric comprises a sequence of port numbers representing ports of respective switches on each level of the spanning tree representation, wherein each of the switches of the spanning tree representation is assigned a number of the port of the previous switch of the spanning tree representation, wherein a first number in the sequence corresponds to a port of a root switch of the spanning tree representation, wherein the configuration packet includes a topology identification of a switch to be configured, and further includes a most significant bit (MSB) to indicate whether the configuration packet is to flow from a connection manager associated with the first device, to the second switch, or the configuration packet is to flow from the second switch to the connection manager.

30. The method of claim 29, wherein identifying a plurality of switches and configuring a path occur during initialization or as a result of a hot plug event.

31. The method of claim 29, wherein the spanning tree representation includes no more than seven levels of switches.

32. The method of claim 29, wherein the path is established to route a first and a second packet of data from the first switch to the second switch wherein the first packet of data comprises data according to a first input/output protocol and the second packet of data comprises data according to a second input/output protocol and the first input/output protocol is different from the second input/output protocol.

33. The method of claim 32, wherein the first and the second input/output protocols are selected from the group consisting of PCI express, USB, DisplayPort, and HDMI.

34. The method of claim 32, wherein the first and the second input/output protocols are routed concurrently.

35. The method of claim 29, wherein the first plurality of switches comprises a first domain and also including identifying a second domain comprised of a second plurality of switches and configuring a second path from a port of the second switch to a port of a third switch of the second domain.

* * * * *